US006757071B1

(12) United States Patent
Goodman et al.

(10) Patent No.: US 6,757,071 B1
(45) Date of Patent: Jun. 29, 2004

(54) INTELLIGENT PRINTER DRIVER AND USER INTERFACE AND METHOD TO RECOMMEND AND/OR AUTOMATICALLY MODIFY A DOCUMENT FOR PRINTING, AND A METHOD THEREFORE

(75) Inventors: Nancy B. Goodman, Penfield, NY (US); Peter A. Torpey, Penfield, NY (US); Robert R. Buckley, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/436,132

(22) Filed: Nov. 9, 1999

(51) Int. Cl.[7] .............................................. G06F 15/00
(52) U.S. Cl. ........................ 358/1.13; 358/1.9; 358/1.15
(58) Field of Search ........................ 358/1.1, 1.9, 1.12, 358/1.13, 1.14, 1.15, 1.16, 1.18, 507, 518, 534

(56) References Cited

U.S. PATENT DOCUMENTS

| | | |
|---|---|---|
| 5,107,332 A | 4/1992 | Chan |
| 5,113,356 A | 5/1992 | Nickell et al. |
| 5,194,905 A | 3/1993 | Brewington |
| 5,200,832 A | 4/1993 | Taniuchi et al. |
| 5,228,118 A | 7/1993 | Sasaki |
| 5,305,119 A | 4/1994 | Rolleston et al. |
| 5,321,434 A | 6/1994 | Strauch et al. |
| 5,337,136 A | 8/1994 | Knapp et al. |
| 5,416,613 A | 5/1995 | Rolleston et al. |
| 5,557,393 A | 9/1996 | Goodman et al. |
| 5,568,248 A | 10/1996 | Wagley |
| 5,572,296 A | 11/1996 | Snelling et al. |
| 5,580,177 A | 12/1996 | Gase et al. |
| 5,588,093 A * | 12/1996 | Harrington .................. 358/1.9 |
| 5,594,557 A | 1/1997 | Rolleston et al. |
| 5,604,567 A | 2/1997 | Dundas et al. |
| 5,627,662 A | 5/1997 | Holmes et al. |
| 5,649,071 A | 7/1997 | Klassen et al. |
| 5,671,059 A | 9/1997 | Vincent |
| 5,682,192 A | 10/1997 | Chen |
| 5,687,303 A | 11/1997 | Motamed et al. |
| 5,689,350 A | 11/1997 | Rolleston |
| 5,713,062 A | 1/1998 | Goodman et al. |
| 5,727,137 A | 3/1998 | LeClair et al. |
| 5,768,487 A | 6/1998 | LeClair et al. |
| 5,784,172 A | 7/1998 | Coleman |
| 5,822,510 A | 10/1998 | LeClair et al. |
| 5,933,182 A | 8/1999 | Appel |
| 6,014,154 A | 1/2000 | Guerin |
| 6,040,927 A * | 3/2000 | Winter et al. ............... 358/534 |
| 6,317,823 B1 * | 11/2001 | Wakai et al. ............... 712/220 |

* cited by examiner

Primary Examiner—Mark Wallerson
(74) Attorney, Agent, or Firm—Fay, Sharpe, Fagan, Minnich & McKee, LLP (57) ABSTRACT

An intelligent printer driver is provided. The printer driver includes a printer detector which detects characteristics of a printer to be used to generate a document unless the driver is specific to a known printer. A document detector detects content of the document to be printed. A matching module compares the characteristics of the printer and the content of the document and determines whether the printer and content of the document are mismatched. A notification module notifies a user if the printer and the document are mismatched and a recommendation module generates recommendations to the user as to modifications of the document which are determined to be mismatched by the printer. The user may then select a preview document shown on the monitor, may request further modifications to the document, may print the document without any modifications, or may abort the print process.

30 Claims, 7 Drawing Sheets

INTELLIGENT PRINTER DRIVER AND USER INTERFACE AND METHOD TO RECOMMEND AND/OR AUTOMATICALLY MODIFY A DOCUMENT FOR PRINTING, AND A METHOD THEREFORE

BACKGROUND OF THE INVENTION

This invention relates generally to printer driver architectures, and more particularly to a printer driver configured to generate an improved output document.

An important objective in many computer systems is the generation of printed documents having high quality images. Critical components in obtaining these documents are the computer printer and printer driver of the computer system. A host computer system includes printer driver software and associated hardware with print data, which is provided to a peripheral printer in an appropriate format for the generation of an output document. As the availability and sophistication of color monitors and color printers has increased, it is common for a computer user to create a full-color image on the color monitor, such as by using desktop publishing software, and then print a full-color printout of the image on a color printer. It is known, however, that color printers and color monitors use different techniques for the formation of color documents. Particularly, a color monitor forms colors by additive light processing in which light from three color primaries, generally red, green and blue (RGB) are added. On the other hand, printed images reflect ambient light. Therefore, printed images generate colors by a subtractive light processing method generally using the colors cyan, magenta, yellow and black (CMYK).

Additive color formation and subtractive color formation have fundamental distinctions, and the range of colors which are displayable on a monitor will be different from the range of colors which may be printable by a printer. In other words, the range or "gamut" of colors displayable by a monitor and the range or "gamut" of colors which are printable by a printer do not have a one-to-one match. Because of these differences it is often difficult to print color images which are perceived as accurate reproductions of displayed color images. Specifically, it is not possible for a printer to generate colors formed on a monitor which are outside of the printable gamut of the printer. Therefore, even though colors may be seen on color monitors, they cannot necessarily be printed on a color printer, since the color printer will not have the range of print capabilities as may be defined by the monitor. Similarly, there are also some low saturation areas of a printer gamut wherein a printed image, which is light subtractive, has a greater color range than a monitor.

However, there are many situations in which a user creates a document for one purpose and it is then printed in a way other than intended. Often these documents have been sent electronically to another person who has a different printer or intends to use the document differently from the creator. One such example of this is dark color slides which are printed on paper or transparencies. While dark colors on the color slides may be desirable when projected, if the images on those slides are then printed onto paper or transparencies, it would result in excessive and undesirable use of ink or toner and the resulting image would be difficult to view. There also exist situations where a document is created with color images, but is printed in black and white. For the dark color areas on the original color document, the translation to a black and white document may not be effective, creating a large stress factor on the printer by using up large amounts of toner or ink and resulting in hard to distinguish images.

Because printing very high area coverages is difficult and costly either xerographically, with ink jets or other types of printers, it is preferable to use white or pale backgrounds for documents to be printed onto paper or transparencies. Documents intended to be used for slides are expected to be projected directly or created photographically and tend to have very dark backgrounds for ease of reading. The documents having such images are of a high quality when projected onto a screen or viewed on the monitor. However, as previously noted when these slides are then printed on paper or transparencies, a large stress on the printer exists and large amounts of ink or toner are used up, often leading to unattractive and/or illegible results. The present invention addresses the foregoing problems.

SUMMARY OF THE INVENTION

In accordance with the present invention, a printer driver is disclosed which includes a document identifier for identifying a document which is to be sent to a printer for printing. A recommendation module is provided, and includes a plurality of available modifications which may be made to the document to be printed. The system may operate in at least one of a manual mode, where modifications to the document are made based on a user selection prior to printing, an interactive mode, where proposed modifications are automatically generated by the printer driver and approved by the user prior to printing, and an automatic mode, where modifications are automatically generated and approved by the printer driver without interaction with the user, prior to printing.

In accordance with another aspect of the present invention, an intelligent printer driver is provided, wherein the printer driver includes a printer detector to detect characteristics of a printer which will be used to generate a document, in a case where the driver is not for a specific printer. Also included is a document detector which detects the content of the document to be printed, and a compatibility determination module which compares the characteristics of the printer and the contents of the document. The compatibility determination module is used to determine whether the printer and the content of the document are compatible or incompatible. Further included is a notification module which generates and issues a notification to a user when it is determined that the printer and the document are non-compatible. When non-compatibility is determined, the recommendation module provides recommendations for modification of the document determined to be mismatched. The recommendation module is used in this manner when the printer driver is operating under its interactive mode. In the manual mode, available modifications are presented without the necessity of the printer driver making a determination of compatibility or incompatibility. In the automatic mode, modifications are made to the document to be printed without user interaction.

DETAILED DESCRIPTION OF THE PREFERRED EMBODIMENTS

Traditionally, a printer driver is an unintelligent converter from application output (e.g. GDI format) to printer instructions (e.g. PostScript). However, since the printer driver is running on a computer, the printer driver has the capacity for more intelligent actions. Therefore, the present invention provides an intelligent printer driver to improve the results of the printing process.

Figure 1:
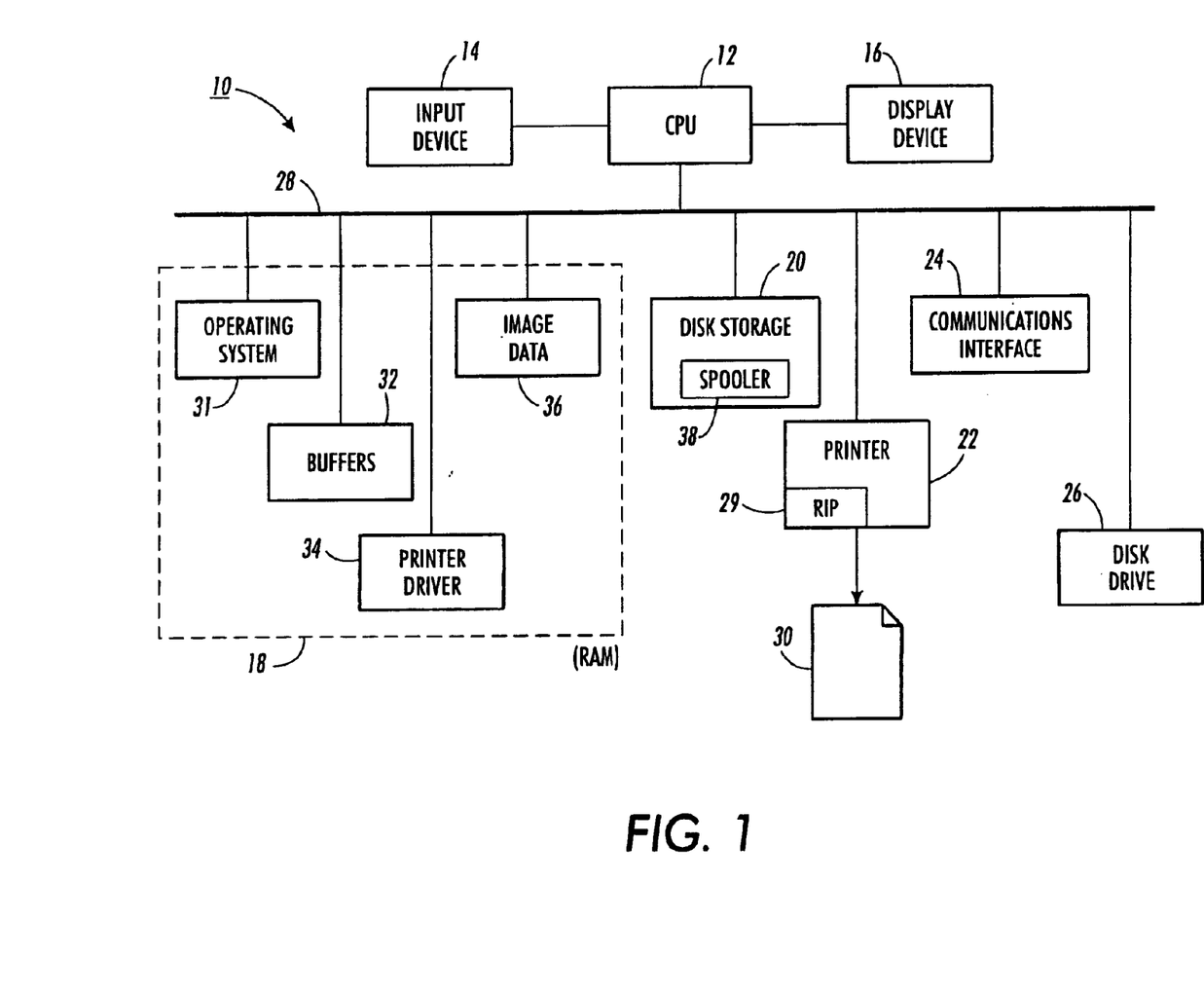
FIG. 1 illustrates a computer system with peripherals incorporating a printer driver according to the concepts of the present invention.

FIG. 1 depicts a block diagram of a computer system 10, which includes a central processing unit (CPU) 12. An input device 14, which may be a keyboard, mouse, microphone, or other known device, and an output device 16, such as a monitor, coupled to CPU 12. Computer system 10 may include random access memory (RAM) 18, a disk storage 20, a printer 22, communications interface 24, and a removable disk drive 26, each coupled to CPU 12 via a signal bus 28. Printer 22 includes a rendering image processor (RIP) 29 used to generate an output document 30.

RAM 18 is depicted as including an operating system 31, buffers 32 for storing data, a printer driver 34, and image data 36. Operating system 31 is a program which when executed by CPU 12 controls and facilitates the operation of CPU 12 or other stored program data. Printer driver 34 is a program which when executed by CPU 12 allows stored data to be formatted and printed at printer 22. Image data 36 is stored data waiting to be processed by printer driver 34 for printing by printer 22. Disk storage 20 includes a spooler 38 for storing documents processed by printer driver 34 and waiting to be printed by printer 22. Printer driver 34 may be initially stored in disk storage 20 and loaded into RAM 18 prior to execution by CPU 12. Disk drive 26 allows printer driver 34 to be stored onto a removable storage medium.

Figure 2:
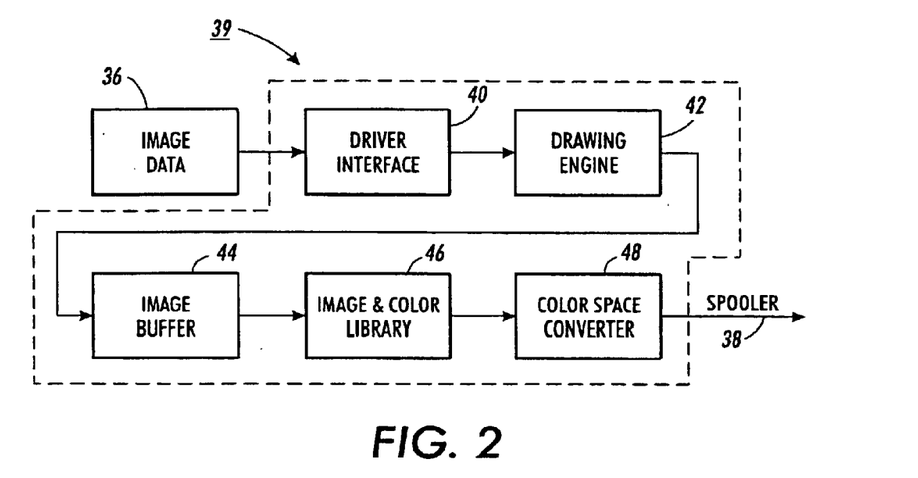
FIG. 2 is a depiction of a printer driver known in existing systems.

Referring now to FIG. 2, a block diagram is shown illustrating a conventional printer driver 39 architecture. It is to be appreciated the following discussion sets forth a printer driver which generates rasters (pixels), however the present invention may be equally implemented with printer drivers which output vectors, or a combination of rasters and vectors.

Conventional printer driver 39 includes a driver interface 40, a drawing engine 42, image buffers 44, an image and color library 46 and a color space converter 48. Driver interface (also called document identifier) 40 receives image data 36, of the document which is to be printed, from the host computer, and transmits it to drawing engine 42. Drawing engine 42 gathers the image information, and draws each object within a specified region into image buffers 44 in a top-down iterative fashion. Drawing an object is implemented by generating and writing a pixel map of the objects within the region to be printed to each image buffer. Drawing engine 42 then transmits the image regions to image and color library 46 which performs enhancement functions such as dithering, color biasing, image resolution, etc., on the banded objects. Image and color library 46 then sends the image to the color space converter 48 to convert the image color, for example, from the RGB model to the CMY (or CMYK) model, which in turn sends the image to the spooler for printing.

Figure 3:
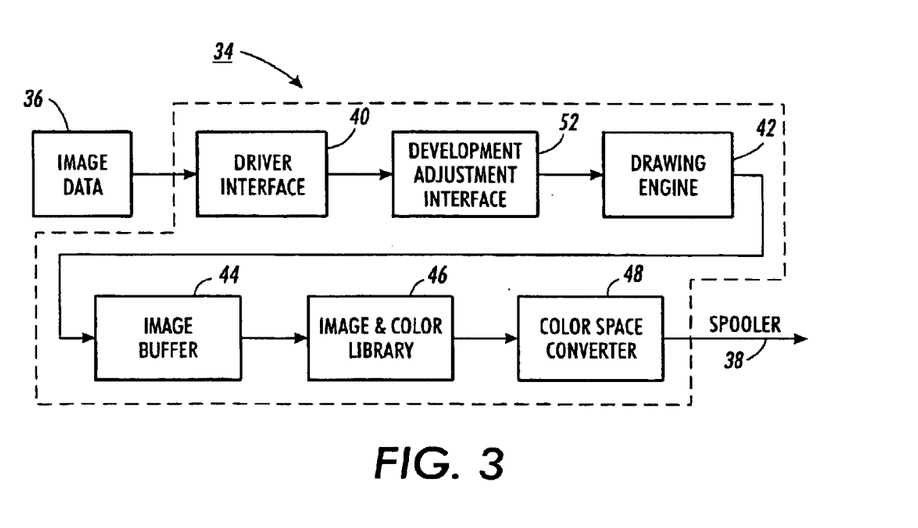
FIG. 3 describes a printer driver according to the teachings of the present invention which may be incorporated into the system of FIG. 1.

The foregoing describes an image data path through a conventional printer driver 39. However, with particular attention to the present invention, printer driver 34 of FIG. 3 is provided with document adjustment interface 52. As previously noted, there are many situations in which a user creates a document for one purpose and then it is printed in a way other than originally intended. Often these documents have been sent electronically from one person to another who has a different printer or needs from the creator of the original document.

Document adjustment interface 52 provides a manner of modifying a document to be printed by determining the compatibility between a printer, which is to print the document, and the document to be printed. More specifically, the content of the document may be the color content or coverage content of the document to be printed such as document 30 from printer 22 (FIG. 1). Printer driver 34, through document adjustment interface 52 notifies the user if the printer and the document to be generated are mismatched, and provides recommendations for modifications to the document. Printer driver 34 also displays a print preview of the proposed modified document to allow the user, (i) to accept the modified document as now presented, (ii) to accept the document with additional changes, (iii) to proceed with printing the original document without modifications, or (iv) to cancel the print process.

Figure 4:
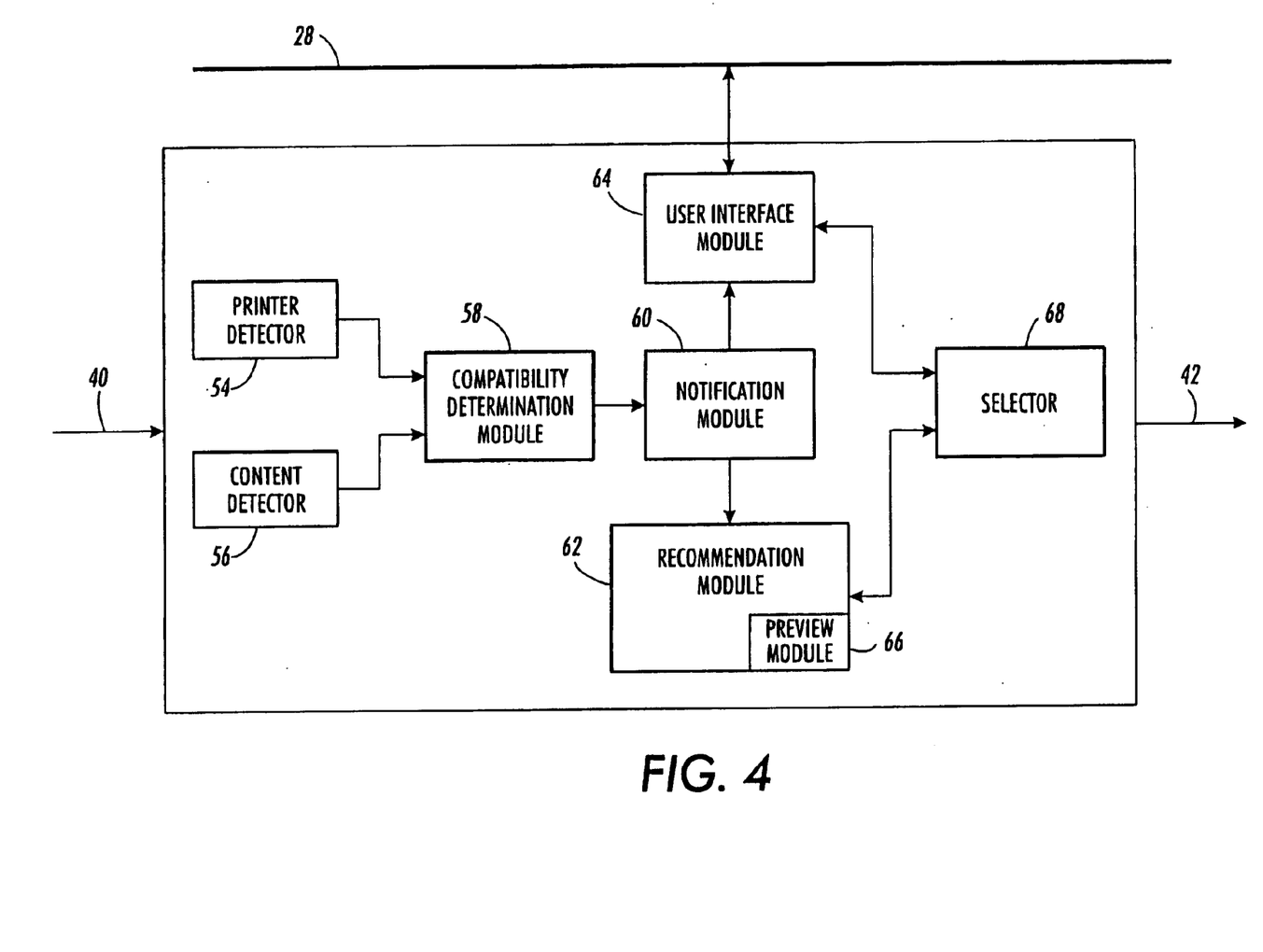
FIG. 4 describes a document adjustment interface according to the teachings of the present invention.

A more detailed view of document adjustment interface 52 is shown in FIG. 4, which may be implemented in software, hardware or a combination of each. Illustrated is a printer detector 54, and content detector 56 whose outputs are supplied to a compatibility determination module (also referred to as a matching module) 58, which determines whether the printer and content of the document to be printed are compatible or incompatible. The output of compatibility determination module 58 is supplied to notification module 60 which is in operative connection with recommendation module 62. When it is determined that a mismatch has occurred, notification module 60 supplies this information to a user by user interface module 64, and suggested modifications are supplied via recommendation module 62. Recommendation module 62 further includes preview module 66, which generates a preview of the modified document for viewing by a user prior to printing. A selector 68 allows the user to select the modified preview document for printing, select the modified preview document and make further changes, request the original document, or cancel the print process. It is to be appreciated the various components of document adjustment interface 52 may be arranged in a variety of configurations, which will accomplish the goals of the present invention. For example, the recommendation module may be designed as a part of the notification module, or the preview module may be designed as self standing, as well as other possible designs.

Figure 5:
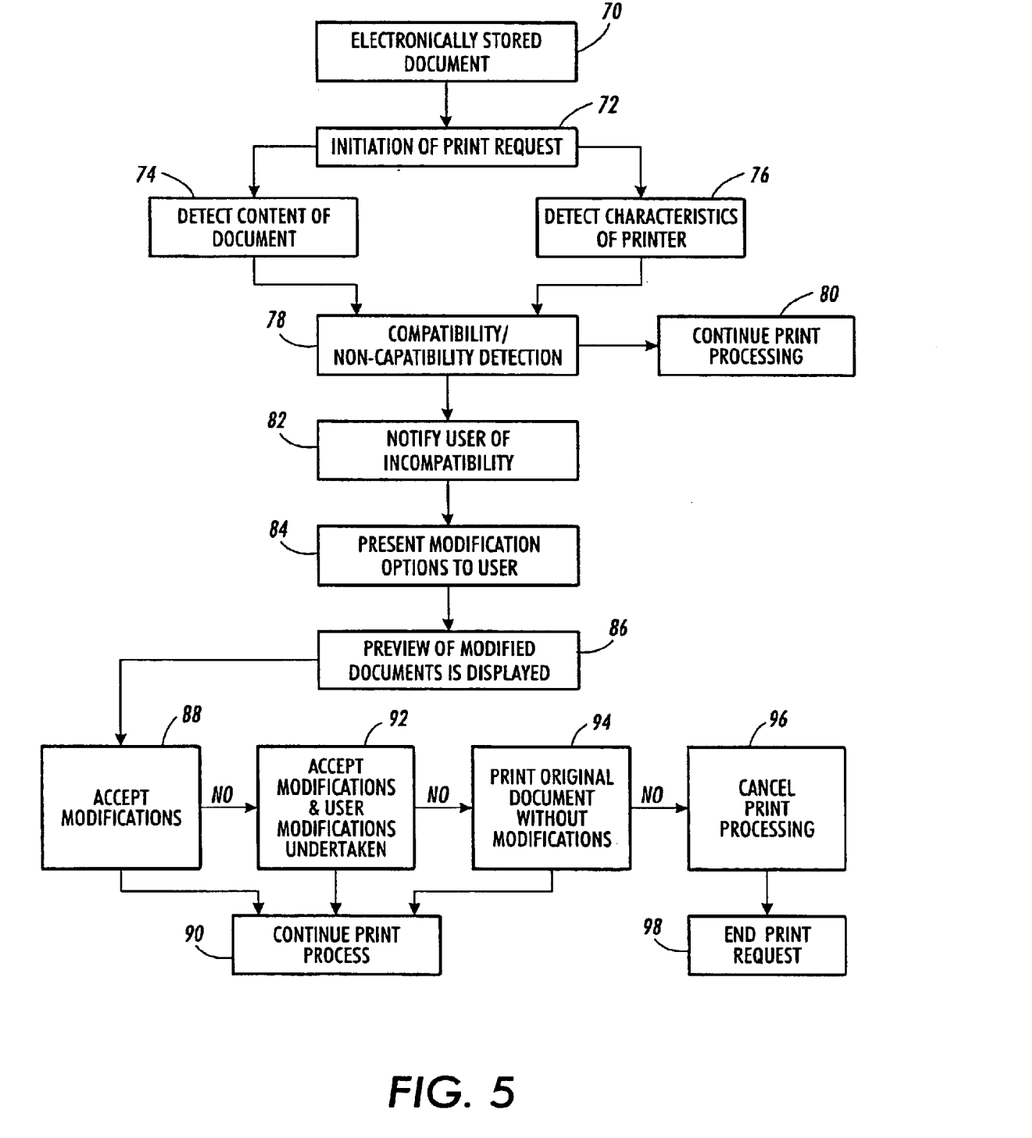
FIG. 5 is a flow chart for the operation of a first embodiment of the document adjustment interface of the present invention.

Operation of document adjustment interface 52 is discussed in more detail with attention to FIG. 5, which is a first embodiment showing an interactive mode print processing of document adjustment. Initially, a document to be printed is electronically stored within a computer system 70. A user initiates a print request 72 to output a hard copy of the electronic document, which acts to identify the document to be printed. Next, the printer driver performs detection processing on the content of the document 74, and on characteristics of the printer which is to print the document 76. Various aspects of the content of the document may be detected. For example, the printer driver may be designed to determine when the document has a high area of color coverage, e.g. greater than 60% of the document or above some other threshold value.

Since many printer drivers are designed for specific printers, step 76 and corresponding printer detector module 54 may, in one embodiment, simply be a storage area of printer characteristics. As an alternative this step and/or module can be designed to obtain the necessary information from another location of the system.

The characteristics which may be detected with regard to the printer, in step 76, may include, for example, determining the type of material on which the document will be printed, e.g., if the document is to be printed on white paper, color paper, or transparencies. It may also be determined whether the printer is a color or black and white printer, whether it is a xerographic printer, a traveling cartridge ink-jet printer, impact printer, etc. The results of steps 74 and 76 are provided to the compatibility determination module to determine whether the characteristics of the document and characteristics of the printer are compatible or incompatible (i.e. matched or mismatched) 78. The determination of what is a desirable output document, and printer combination may be stored as parameters for use in step 78. If it is determined the document to be printed and the printer are compatible, the process continues printing 80. On the other hand, when it is determined they are incompatible, the printer driver notifies the user 82. The notification includes suggested modifications presented by the printer driver 84. These modifications may be presented to the user in the form of a preview of the modified document, displayed on a monitor of the computer system 86. Once a user has previewed the suggested modifications, the user may accept the modifications 88, which will result in continuation of the printing process 90. Alternatively, the user may accept the modifications and make additional changes 92, where-after the printing process will continue 90. As still a further alternative, the user may reject the modifications and request printing of the original document without modifications 94, where-after the printing process will continue 90. Lastly, the user may instruct that the print request be cancelled 96, which will result in the end of print processing 98.

Figure 6:
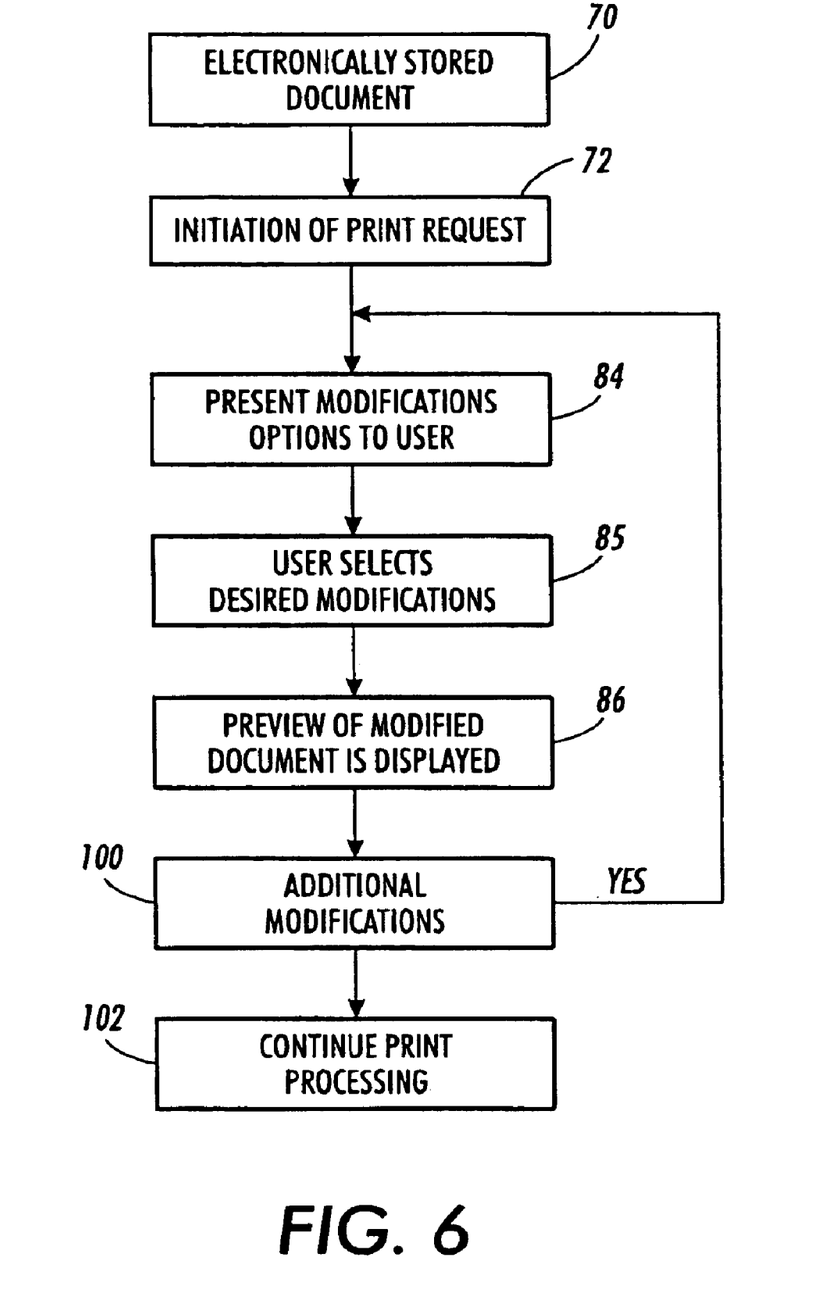
FIG. 6 is a flow chart for the operation of a second embodiment of the document adjustment interface of the present invention.

FIG. 6 depicts a second embodiment showing a manual mode/print processing module of document adjustment, using elements of document adjustment interface 52. It is to be appreciated that not each of the elements shown in FIG. 4 will be necessary for this embodiment. In particular, as shown in the flow chart of FIG. 6 steps 70 and 72 are the same as those shown in FIG. 4. However, steps 74–82 of FIG. 5 and therefore the corresponding modules of FIG. 4 are not necessary in this embodiment. Rather, once a user initiates a print request 72, modification options are presented to the user 84. Thereafter, a user will select the desired modification options 85, and a preview of the modified document or documents will be displayed 86. At this point the user may select to either alter or make additional modifications 100 which would require the system to loop back above block 84 for further inputs. If the user does not add further modifications, the system continues the print processing procedure 102. Thus, in this embodiment, manual control of the modifications are directly placed within the user's hands without substantial input from the printer driver, other than providing the various modification options and the ability to alter the document based on these modifications.

Figure 7:
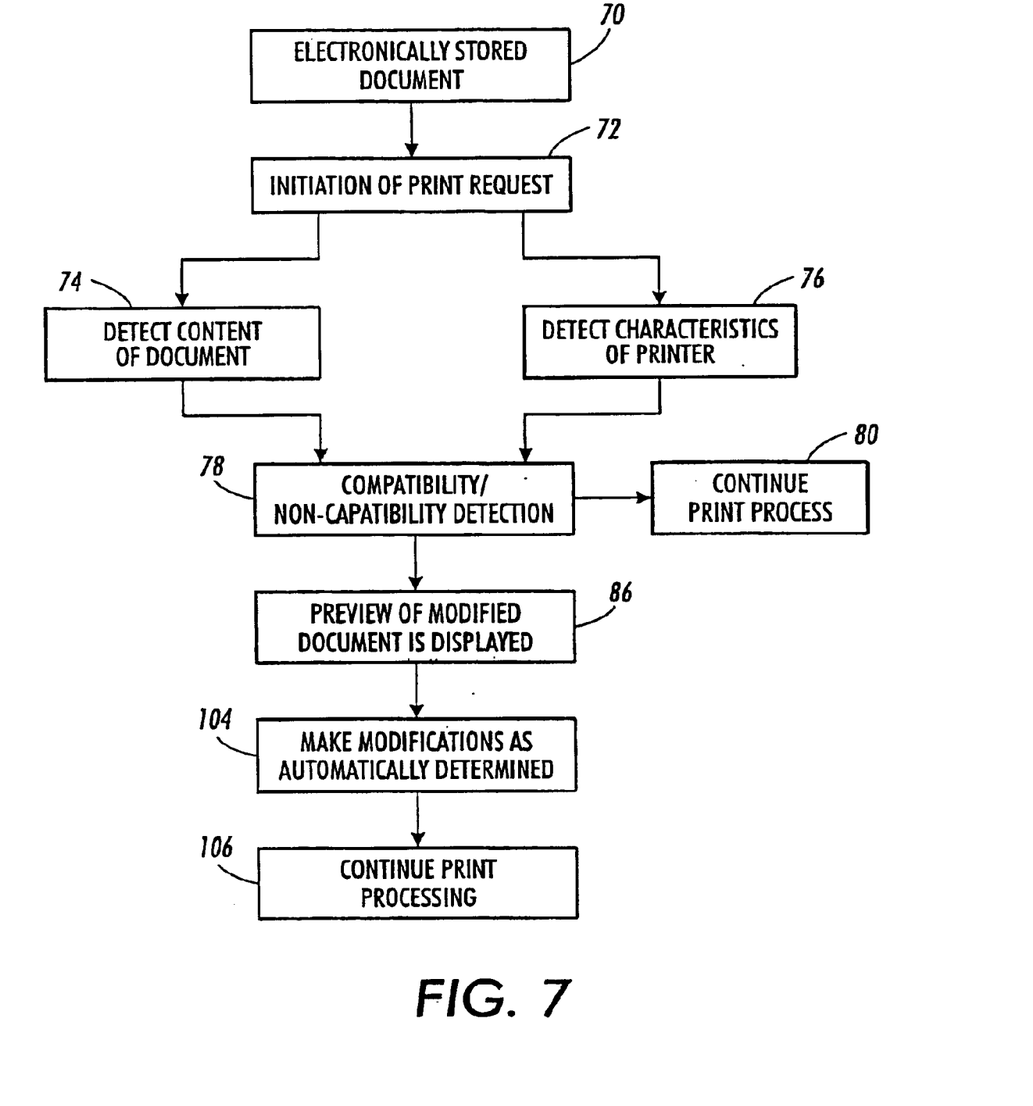
FIG. 7 is a flowchart for operation of a third embodiment of the document adjustment interface of the present invention.

Turning to a third embodiment for document modification as shown in FIG. 7, a fully automated mode is described. In this embodiment, steps 70–80 are similar to that provided for in connection with FIG. 5. However, the steps of notifying the user of incompatibility, step 82, and presenting the modification options to a user, step 84, of FIG. 5 are not provided since the modifications are automatically made, dependent upon decisions of the printer driver, based on criteria which may be preset, determined as a function of the printer or predetermined by the user. FIG. 7 does include, as an optional step, providing a preview of the modified documents to a user 86. Step 104 accepts the modifications and makes such changes prior to printing, and step 106 continues the printing process. It is also to be understood that while this embodiment is fully automated, a step and module may be provided which allows a user to cancel the print processing if the output is determined to be undesirable.

Figure 8:
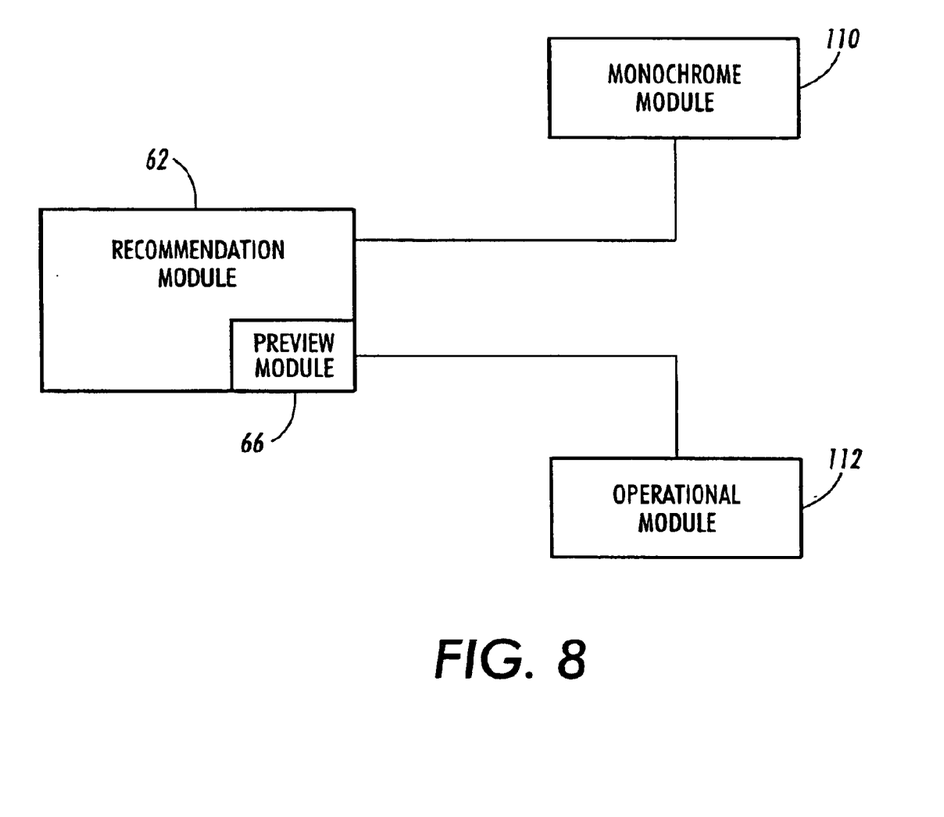
FIG. 8 illustrates interfaces between document adjustment modules and the printer driver of the present invention.

As previously discussed, there are circumstances when a color document is being sent to a black and white printer. In these instances, and as shown in FIG. 8, recommendation unit 62 may recommend invoking a black and white friendly monochrome module 110, or similar scheme to retain some of the information conveyed by color by using various shadings, textures or other means. In the Xerox C55 color laser printer driver, (manufactured by Xerox Corporation), black and white friendly monochrome is an option always made available, which the user needs to know when to invoke. In accordance with the teachings of this embodiment, it is an option made available when the printer driver, after analysis and recognition, decides it is applicable. Therefore in this embodiment, the user only needs to determine whether or not they wish to invoke the black and white monochrome module 110 and does not need to determine whether or not it applies, since the compatibility determination module will make this determination. FIG. 8 also depicts that additional adjustments to the document can be made by other specific operations such as by the generically defined, operational module 112.

One instance where it is anticipated that printer driver 34 will be implemented, is when printer driver 34 recognizes that a document is being sent to a xerographic printer for transparencies. In this instance, the present invention will determine that xerographically printed yellow on transparency film may project as a very muddy tan. Therefore in one embodiment an assumption may be built into the document adjustment interface 52 that the yellow was intended to produce a quite visible and high chroma object or text. With this built-in determination, printer driver 34 will operate to recommend replacing yellow with another color, for example, a mid-tone pink or green.

In an embodiment where printer detector 54 recognizes that a document is being sent to a traveling cartridge ink-jet printer, if the document contains color lines at the top and/or bottom and/or sides of the page (as slides often do for purely aesthetic reasons) document adjustment interface 52 will issue a recommendation to remove these lines to increase the print job speed.

It was previously noted that printer detector 54 may be configured to determine the type of work piece, i.e. transparencies, cover stock, color paper, etc. which is to be used with the printer. In another embodiment, recommendation module 62 may be configured to sense secondary events, such as selecting "tray 2" which is known to contain transparencies, cover stock or the other special media. Therefore, while such characteristics may be built into printer detector 54, modification module 60 may also be designed to sense events which will alter the recommendations provided to a user.

Recommendation module 62 can be custom designed for user specific capabilities. For example, an advertising agency may have a printer driver of the present invention where the recommendation unit selects "red" instead of "blue" as a more exciting color for advertising copy. Alternatively, the printer driver may be designed for aesthetic results (e.g. using a professionally selected color palette rather than a set of colors that do not coordinate well, or forcing all text to be larger than a particular size). Locating these capabilities within printer driver 34 is possible by providing the printer driver with intelligence.

As discussed, once non-compatibility and/or a high area of coverage has been found to exist, the user is given several options. One of the options is to continue with printing as the original document exists. This may be especially desirable if the image is a dark pictorial in which the user does not want any changes.

A second option is to reduce the image area coverage by a fixed amount, for example 50%, or by however much is required to reduce the total area coverage to an acceptable value. This option will reduce the total material consumption, but will neither change the overall appearance or reduce the local stress on the printer.

A third option provided in the present embodiment is to replace all or some fraction of occurrences of "rich" black, e.g. RGB=0, with single color black. Other neutral rendering techniques are also possible in the driver.

A further option is to lighten the image uniformly. Particularly, under this option a reduction in the intensity and area coverage of each local color would occur. This is similar to known "toner-saver", "economy", "pastel" or "draft" modes. By lightening the image uniformly, a reduction in contrast of the printed areas against white text or objects in half-tones would exist thereby causing less sharp edges.

Still another option is to invert the lightness of each locally requested color without altering its hue. Thus, for example, black and white would be interchanged, a dark red would become a pale red, and a light blue would become a dark blue. This option retains local contrast and legibility while substantially reducing area coverage. Other color transforms including ones leveraging existing full to highlight color transforms, may also be provided as options.

In another embodiment of the present invention, when a dark background, as predefined during the configuration of this system exists, a notification is provided to the user. This notification may be invoked in several manners. One possibility is to have a notice flashed on system monitor 16, that printing the document as it now exists would produce poor results. This may be provided in a pop-up screen such as a "Tip Of The Day" block and may also be designed to include inquiries such as "Do you wish to proceed with this color background?", "Yes/No". This would require the user to take an affirmative step of overriding what has been determined in the configuration of the system as a situation which would result in a poor output document.

The system may also be designed to allow any color selection, but when the print request is selected a notice is displayed prior to printing. If a "No" selection is made, the system returns to the color selection process.

A further embodiment of the present invention allows printer driver 34 to generate a recommendation of an appropriate color scheme with a pale or white background, in anticipation of the output device to be used. Clip-art and pictorials would be unaffected with this color scheme implementation since these colors are selected independent of the "color scheme."

The present invention may, in another embodiment, be implemented using object-oriented rendering in printer driver 34 or in the raster image processor (RIP) 29. Under this scenario, a user may simply select an option such as "Modify colors for hard copy output." The printer driver 34 or RIP 29 would then cause the background to be white with the following characteristics depending piecewise on image content:

(i) boxes of any shape (oval, rectangular, etc.) and their contents would remain unchanged, except for the addition of a thin black border around the box.;

(ii) pictorials would remain unchanged except for the addition of a thin black border around each;

(iii) any graphic or text object superimposed on a pictorial or box would remain unchanged as would clip-art;

(iv) white text in background areas would become black;

(v) colored text in background areas would retain its hue but acquire maximum chroma for highest contrast. The exception would be yellow and near-yellow text (colors with hue angles in CIELAB space between approximately 70° and 110°, with a smooth transition to colors outside this range), which would need to have enough black added to achieve a lightness similar to saturated red or green in order to maintain some contrast with the now light background. This would substantially reduce the chroma, but would approximately retain the hue. Thus, any color coding would be approximately retained; and (vi) line art in background areas would follow the same rules as text.

The print driver is designed to either make the agreed upon modifications itself before conveying an image file containing the document to the RIP, or the printer driver may attach tags to the image file for the RIP to make the modifications. The actual changes or generation of tags will occur dependent upon the selections made by the user. It is noted that the changes are based upon having knowledge about the printer, but are transparent to the application and the RIP.

The invention has been described with reference to the preferred embodiments. Obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A printer driver comprising:

a document identifier which receives image data of a document which is to be sent to a printer for printing;

a document detector which detects color content and coverage of the document to be printed, wherein the color content is a percentage of the document which has color coverage;

a compatibility determination module which compares the characteristics of the printer and the color content of the document, and determines the compatibility of the printer and color content of the document;

a notification module which notifies a user if it is found that the printer and the documents are non-compatible, wherein the printer and the document are non-compatible when color coverage on the document is in excess of a threshold value, which may be selected by the user;

a recommendation module having a plurality of available modifications which may be made to the document to be printed, when it is determined the document is non-compatible with the printer;

at least one of, a manual print processing module, wherein modifications to the document are made based on a user selection prior to printing;

an interactive print processing module, wherein proposed modifications are automatically generated by the printer driver and approved by the user, prior to printing; and an automatic print processing module, wherein modifications are automatically generated and approved by the printer driver without interaction with the user.

2. The print driver of claim 1 wherein the recommendation module further includes, a print previewer which displays a preview of the document to be printed, with the modifications.

3. The print driver of claim 1 further including, a selector, which allows the user to (i) accept the modified document, (ii) undertake further modification, and (iii) print the document without modifications.

4. The print driver according to claim 1 further including a printer detector which detects characteristics of the printer to be used to print the document.

5. The print driver according to claim 4 wherein an option to invoke a black and white monochrome mechanism is provided when the printer detector recognizes the printer which is going to print the document is a black and white printer, and the color detector detects the document is a color document, wherein invoking the black and white monochrome mechanism maintains at least some of the information conveyed by color by using at least shading, and texturing techniques.

6. The print driver according to claim 1 wherein the recommendation module includes a recommendation to at least one of, automatically re-color the document, automatically re-size the document, cancel the print process and alter the document by user input, and proceed with processing of the document.

7. The print driver according to claim 6 wherein the option of re-coloring includes at least one of, an option to replace at least one instance of a RGB formed black with a single color black;

an option of uniformly lightening a document wherein intensity and area coverage of each local color is uniformly reduced;

an option to invert the lightness of each locally requested color without altering its hue; and an option of performing full-to-highlight color transforms.

8. The print driver according to claim 1 wherein the document detector is configured to detect selection of a dark background and the notification module informs a user as to the use of a dark background.

9. The print driver according to claim 8 wherein the notification module is configured to include a notice generated to inform the user of the selection of a dark background by at least one of, a notice to the user immediately upon selection of the dark background and before initiation of printing instructions; and a suggested color scheme for the detected printer.

10. The print driver according to claim 1 wherein rendering of the document is accomplished by use of object oriented rendering in the driver.

11. A method of generating a print of a document stored in an electronic printing system, using a printer driver, the method comprising:

identifying a document which is to be sent to a printer for printing;

detecting color content and coverage of the document to be printed;

comparing the color content and coverage of the document, to the printer characteristics to determine compatibility;

notifying a user when it is found the printer and the document are not compatible, wherein the user is notified of the non-compatibility when the detecting step has detected color coverage on the document in excess of a threshold value, which may be selected by the user;

presenting at least one of a plurality of available modifications which may be made to the document to be printed; and at least one of, performing manual modifications to the document, but the user, based on the plurality of available modifications, prior to printing;

performing interactive modifications to the document, wherein proposed modifications are automatically generated by the printer driver, and the proposed modifications need to be approved by the user, prior to printing;

performing automatic modifications to the document, wherein modifications are automatically made to the document to be printed by the printer driver, without user intervention.

12. The method of claim 11 further including, previewing, using a print previewer of the printer driver, a proposed electronic document to be printed, with the modifications.

13. The method of claim 11 further including, selecting, using a selector, at least one of, (i) accepting the proposed modified electronic document, (ii) allowing for further modifications, and (iii) printing the output document without modifications.

14. The method according to claim 11 further including providing an option to invoke a black and white monochrome mechanism when the printer detector recognizes the printer which is going to print the document is a black and white printer, and the color detector detects the document is a color detector, wherein invoking the black and white monochrome mechanism maintains some of the information conveyed by color by using at least shading, and texturing techniques.

15. The method according to claim 11 wherein the recommending step further includes at least one of, automatically re-coloring the document, automatically re-sizing the document, aborting the print process, and manually altering the document, and proceeding with processing of the document.

16. The method according to claim 15 wherein the step of re-coloring includes, providing an option of replacing at least one instance of a RGB formed black with a single color black;

providing an option of uniformly lightening an image, whereby intensity and area coverage of each local color is uniformly reduced;

providing an option to invert the lightness of each locally requested color without altering its hue; and providing an option of performing full-to-highlight color transforms.

17. The method according to claim 11 further including detecting, with a printer detector of the printer driver, characteristics of the printer.

18. The method according to claim 17 wherein the document detecting step includes detecting a selection of a dark background, and the notifying step informs a user as to the use of a dark background inconsistent with hardcopy printouts.

19. The method according to claim 18 wherein the notifying step includes, informing the user of the selection of a dark background by at least one of,
- generating a notice to the user immediately upon selection of the dark background;
- generating the notice to the user after selection of the dark background but before initiation of printing instructions;
- generating a suggested color scheme for the detected printer.

20. The method according to claim 11 further including a step of tagging an attachment mechanism which attaches information regarding modification to an image file for the document to be printed, whereby the image file is to be passed on to a raster image processor for processing.

21. The method to claim 11, wherein the step of modifying takes place through the use of object oriented rendering in one of the printer driver and a raster image processor.

22. In a printing system using a printer to generate an output document from an electronic document, a printer driver comprising:
- a printer detector which detects characteristics of the printer being used to generate the output document;
- a document detector which detects content of the output document to be printed, wherein the content is a percentage of the document which has color coverage;
- a matching module which compares the detected printer to be used and the content of the document and determines whether the printer and content of the document are mismatched;
- a notification module which notifies a user if the printer and the content of the output document are mismatched, wherein the printer and the documents are mismatched when the color coverage on the document is in excess of a threshold value which may be selected by the user; and
- a recommendation module for recommending to the user a modification the output document determined to be mismatched with the printer.

23. A printer driver comprising:
- a document identifier which receives image data of a document which is to be sent to a printer for printing;
- a document detector which detects the color content and coverage of the document to be printed;
- a compatibility determination module which compares the characteristics of the printer and the content of the document, and determines the compatibility of the printer and content of the document;
- a notification module which notifies a user if it is found that the printer and the documents are non-compatible;
- a recommendation module having a plurality of available modifications which may be made to the document to be printed, when it is determined the document is non-compatible with the printer;
- at least one of,
  - a manual print processing module, wherein modifications to the document are made based on a user selection prior to printing;
  - an interactive print processing module, wherein proposed modifications are automatically generated by the printer driver and approved by the user, prior to printing;
  - an automatic print processing module, wherein modifications are automatically generated and approved by the printer driver without interaction with the user; and
  - a tag which attaches information regarding modifications to an image file for the document to be printed, wherein the image file is to be passed on to a raster image processor for processing.

24. The printer driver of claim 23 wherein the recommendation module further includes,
- a print previewer which displays a preview of the document to be printed, with the modifications.

25. The printer driver according to claim 23 further including a printer detector which detects characteristics of the printer to be used to print the document.

26. The printer driver according to claim 23 wherein the recommendation module includes a recommendation to at least one of, automatically re-color the document, automatically re-size the document, cancel the print process and alter the document by user input, and proceed with processing of the document.

27. The printer driver according to claim 23 wherein the option of re-coloring includes at least one of,
- an option to replace at least one instance of a RGB formed black with a single color black;
- an option of uniformly lightening a document whereby intensity and area coverage of each local color is uniformly reduced;
- an option to invert the lightness of each locally requested color without altering its hue; and
- an option of performing full-to-highlight color transforms.

28. A method of generating a print of a document stored in an electronic printing system, using a printer driver, the method comprising:
- identifying a document which is to be sent to a printer for printing;
- detecting the color content and coverage of the document to be printed;
- comparing the color content and coverage of the document, to the printer characteristics to determine compatibility;
- notifying a user when it is found the printer and the document are not compatible;
- presenting at least one of a plurality of available modifications which may be made to the document to be printed;
- at least one of,
  - performing manual modifications to the document, but the user, based on the plurality of available modifications, prior to printing;
  - performing interactive modifications to the document, wherein proposed modifications are automatically generated by the printer driver, and the proposed modifications need to be approved by the user, prior to printing;
  - performing automatic modifications to the document, wherein modifications are automatically made to the document to be printed by the printer driver, without user intervention, and
- tagging an attachment mechanism which attaches information regarding modification to an image file for the documents to be printed, wherein the image file is to be passed on to a raster image processor for processing.

29. The method of claim 28 further including, previewing, using a print previewer of the printer driver, a proposed electronic document to be printed, with the modifications.

30. The method according to claim 28 wherein the recommending step further includes at least one of,
- automatically re-coloring the document,
- automatically re-sizing the document,
- aborting the print process, and
- manually altering the document, and proceeding with processing of the document.

* * * * *